(12) United States Patent
Sakamoto et al.

(10) Patent No.: US 12,445,193 B2
(45) Date of Patent: Oct. 14, 2025

(54) CONTROL APPARATUS AND CONTROL METHOD (71) Applicant: NTT, Inc., Tokyo (JP)

(72) Inventors: Kazumitsu Sakamoto, Musashino (JP); Yosuke Fujino, Musashino (JP); Yasuyoshi Kojima, Musashino (JP); Daisuke Goto, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 242 days.

(21) Appl. No.: 18/036,351

(22) PCT Filed: Nov. 26, 2020

(86) PCT No.: PCT/JP2020/043997
§ 371 (c)(1),
(2) Date: May 10, 2023

(87) PCT Pub. No.: WO2022/113230
PCT Pub. Date: Jun. 2, 2022

(65) Prior Publication Data
US 2023/0412253 A1 Dec. 21, 2023

(51) Int. Cl.
*H04B 7/185* (2006.01)
*H04B 7/195* (2006.01)

(52) U.S. Cl.
CPC ......... *H04B 7/18513* (2013.01); *H04B 7/195* (2013.01)

(58) Field of Classification Search
CPC .................. H04B 7/155; H04B 7/15528; H04B 7/15585; H04B 7/185; H04B 7/1851; H04B 7/18513; H04B 7/2041
See application file for complete search history.

(56) References Cited

U.S. PATENT DOCUMENTS

| 8,891,693 | B2* | 11/2014 | Seyama | H04L 25/03337 375/346 |
| 9,915,734 | B2* | 3/2018 | Scheitlin | G01S 19/071 |
| 2017/0322313 | A1* | 11/2017 | Revol | G01S 19/396 |

OTHER PUBLICATIONS

Mohamed Lassaad Ammari et al., Low Complexity ZF and MMSE Detectors for the Uplink MU-MIMO Systems With a Time-Varying Number of Active Users, IEEE Transactions on Vehicular Technology, vol. 66, No. 7, Jul. 2017.

* cited by examiner

*Primary Examiner* — Tuan Pham
(74) *Attorney, Agent, or Firm* — Harness, Dickey & Pierce, P.L.C.

(57) ABSTRACT

There is provided a control device of a wireless communication system including the control device that is installed on a moving object and moves, a first communication device that transmits a desired signal to the control device by a first wireless method, a second communication device that transmits an interference signal interfering with the desired signal by a second wireless method, and one or more third communication devices, the control device including: a reception unit that acquires a wireless signal including a reference signal transmitted from the third communication device in the vicinity of the second communication device by a third wireless method and a desired signal transmitted from the first communication device by the first wireless method; an extraction unit that extracts the reference signal from the wireless signal based on the third wireless method; an estimation unit that estimates a propagation channel between the third communication device and the control device based on the reference signal; and a beam control unit that directs a null of a reception beam in an arrival direction of the reference signal based on the propagation channel.

7 Claims, 5 Drawing Sheets

CONTROL APPARATUS AND CONTROL METHOD

CROSS-REFERENCE TO RELATED APPLICATIONS

This application is a 371 U.S. National Phase of International Application No. PCT/JP2020/043997, filed on Nov. 26, 2020. The entire disclosure of the above application is incorporated herein by reference.

TECHNICAL FIELD

The present invention relates to a control apparatus and a control method.

BACKGROUND ART

With the development of Internet of Things (IoT) technology, installing IoT terminals including various sensors at various places on the Earth has been studied. Furthermore, it is also assumed that the IoT will be used to collect data at a place where it is difficult to install a base station (for example, buoys or ships on the sea, and mountainous areas). Meanwhile, there is a technology in which an unmanned aerial vehicle (UAV), a geostationary satellite, or the like wirelessly communicates with a communication device on the ground.

Furthermore, in recent years, a satellite IoT platform has been studied. In the satellite IoT platform, a relay device installed on a moving object such as an artificial satellite collects data from IoT terminals installed on the ground or on the sea. In a case where a low orbit satellite collects data from a terminal using the satellite IoT platform (hereinafter, referred to as a "satellite IoT terminal"), the satellite IoT terminal uplink-transmits data as a desired signal to the low orbit satellite when the low orbit satellite passes through the sky.

Here, there is a case where the desired signal transmitted from the satellite IoT terminal to the low orbit satellite is interfered with by an interference signal transmitted from a terminal using a ground IoT platform (hereinafter, referred to as a "ground IoT terminal"). In the ground IoT platform, a non-moving relay device may collect data from an IoT terminal installed on the ground.

In order for the low orbit satellite to receive the weak desired signal transmitted from the IoT terminal on the ground toward the low orbit satellite, it is effective that the low orbit satellite control the direction of a reception beam using a plurality of reception antennas. For this reason, a zero forcing (ZF) method and a minimum mean square error (MMSE) method are known as methods for directing a reception beam in an arrival direction of a desired signal while directing a null of the reception beam in an arrival direction of an interference signal (refer to Non Patent Document 1).

In the ZF method and the MMSE method, the component of the propagation channel of the desired signal and the component of the propagation channel of the interference signal are estimated using the known signal. A weighting coefficient of the ZF or the MMSE is derived based on the estimated matrix of each propagation channel, thereby generating a reception beam.

CITATION LIST

Non Patent Document

Non Patent Document 1: M. L. Ammari and P. Fortier, "Low complexity ZF and MMSE detectors for the uplink MU-MIMO systems with a time-varying number of active users,'" IEEE Trans. Veh. Technol., vol. 66, no. 7, pp. 6586-6590, July 2017.

SUMMARY OF INVENTION

Technical Problem

However, in the satellite IoT platform, since an interference signal arrives at a low orbit satellite from an enormous number of ground IoT terminals, it is difficult to estimate the component of the propagation channel of the interference signal. Therefore, even when the ZF method and the MMSE method are used, in a case where an interference signal arrives at a low orbit satellite from an enormous number of ground IoT terminals, the reception power of the interference signal may be larger than the reception power of the desired signal. In such a case, it is difficult to demodulate the desired signal unless the influence of the interference signal is suppressed by constantly directing the null of the reception beam in the arrival direction of the interference signal.

Furthermore, the signal sequence and the arrival timing of the interference signal transmitted from the ground IoT terminal are unknown. Therefore, it is difficult to constantly direct the null of the reception beam to the generation source (for example, a metropolitan area) of the interference signal. As described above, there is a case where the reception sensitivity of the wireless signal transmitted from the IoT terminal communicating with the moving relay device cannot be improved.

In view of the above circumstances, an object of the present invention is to provide a control device and a control method capable of improving reception sensitivity of a wireless signal transmitted from an IoT terminal communicating with a moving relay device.

Solution to Problem

According to an aspect of the present invention, there is provided a control device of a wireless communication system including the control device that is installed on a moving object and moves, a first communication device that transmits a desired signal to the control device by a first wireless method, a second communication device that transmits an interference signal interfering with the desired signal by a second wireless method, and one or more third communication devices, the control device including: a reception unit that acquires a wireless signal including a reference signal transmitted from the third communication device in the vicinity of the second communication device by a third wireless method and a desired signal transmitted from the first communication device by the first wireless method; an extraction unit that extracts the reference signal from the wireless signal based on the third wireless method; an estimation unit that estimates a first propagation channel between the third communication device and the control device based on the reference signal; and a beam control unit that directs a null of a reception beam in an arrival direction of the reference signal based on the first propagation channel.

According to another aspect of the present invention, there is provided a control method executed by a control device of a wireless communication system including the control device that is installed on a moving object and moves, a first communication device that transmits a desired signal to the control device by a first wireless method, a second communication device that transmits an interference signal interfering with the desired signal by a second wireless method, and one or more third communication devices, the control method including: a reception step of acquiring a wireless signal including a reference signal transmitted from the third communication device in the vicinity of the second communication device by a third wireless method and a desired signal transmitted from the first communication device by the first wireless method; an extraction step of extracting the reference signal from the wireless signal based on the third wireless method; an estimation step of estimating a first propagation channel between the third communication device and the control device based on the reference signal; and a beam control step of directing a null of a reception beam in an arrival direction of the reference signal based on the first propagation channel.

Advantageous Effects of Invention

According to the present invention, it is possible to improve the reception sensitivity of the wireless signal transmitted from the IoT terminal communicating with the moving relay device.

DESCRIPTION OF EMBODIMENTS

Hereinafter, embodiments of the present invention will be described in detail with reference to the drawings.

Figure 1:
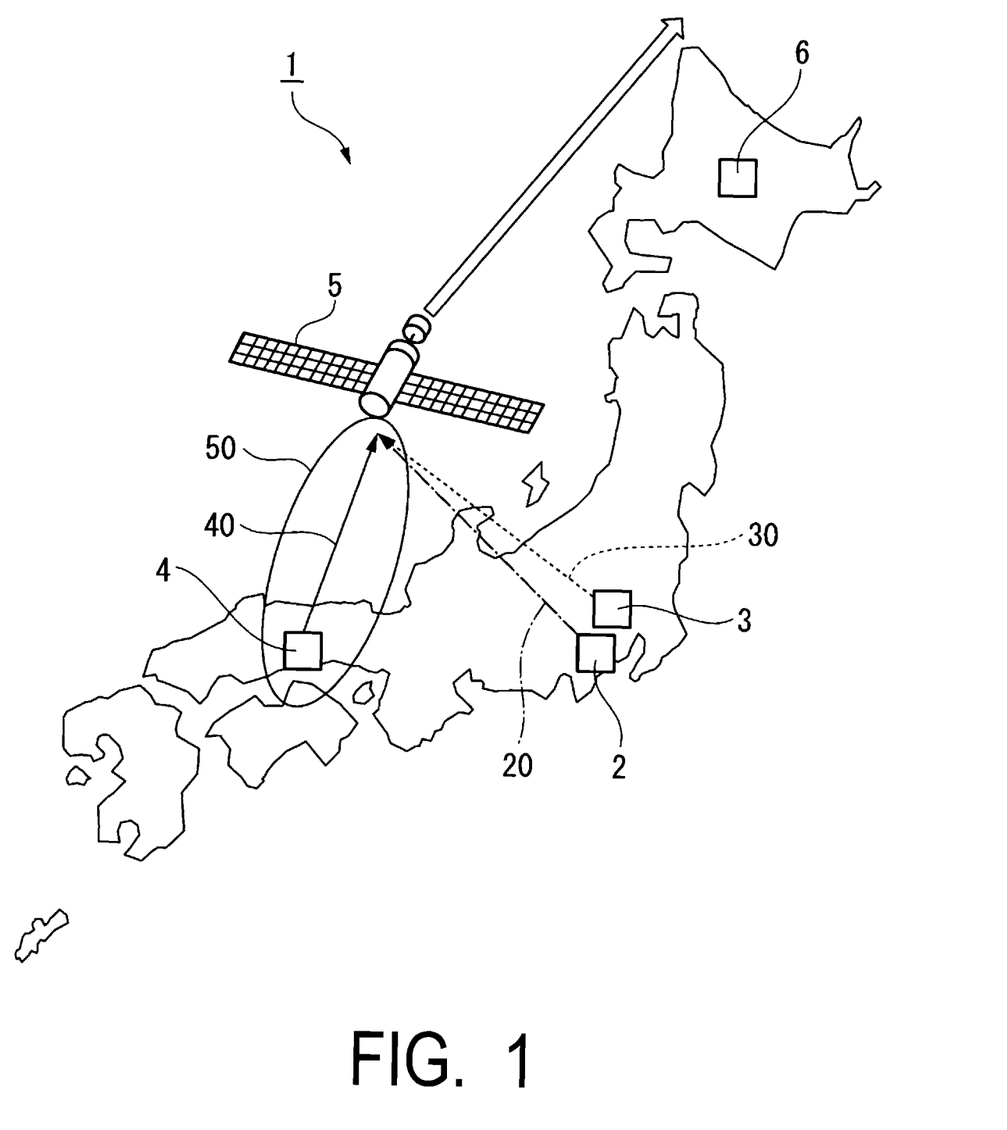
FIG. 1 is a diagram illustrating a schematic example of a wireless communication system according to an embodiment.

FIG. 1 is a diagram illustrating a schematic example of a wireless communication system 1 according to an embodiment. The wireless communication system 1 includes a reference station 2, an interference station 3, a terminal station 4, a mobile relay station 5, and a base station 6. In the wireless communication system 1, the number of each of the interference station 3, the terminal station 4, the mobile relay station 5, and the base station 6 is any number. It is assumed that the number of each of the reference station 2, the interference station 3, and the terminal station 4 is large.

The reference station 2, the interference station 3, the terminal station 4, and the base station 6 are installed, for example, on the ground or on the sea. Here, the reference station 2 is installed in the vicinity of the interference station 3. That is, the reference station 2 is installed within a predetermined distance from the interference station 3. For example, the reference station 2 is installed on the rooftop of a high-rise building or the like such that a wireless signal transmitted from the reference station 2 is not shielded by surrounding buildings.

Hereinafter, a desired signal transmitted from the terminal station 4 to the mobile relay station 5 using a wireless signal is referred to as a "terminal uplink signal". A wireless signal transmitted from the mobile relay station 5 toward the base station 6 is referred to as a "base station downlink signal".

The reference station 2 is a satellite IoT terminal. The reference station 2 constantly transmits the reference signal 20 to the mobile relay station 5 by a wireless method used in the satellite IoT platform toward the mobile relay station 5 moving in the sky. The plurality of reference stations 2 may alternately transmit the reference signal 20 by the third wireless method at regular time intervals.

The interference station 3 is a ground IoT terminal. Among a large number of ground IoT terminals, for example, 60% or more of the ground IoT terminals are used in a metropolitan area. The interference station 3 transmits an interference signal. The interference signal is a wireless signal that interferes with the terminal uplink signal transmitted from the terminal station 4. The interference station 3 transmits the interference signal 30 by the second wireless method used in the ground IoT platform. The interference signal 30 interferes with a terminal uplink signal 40. That is, interference signals transmitted from a large number of interference stations 3 may arrive at the mobile relay station 5.

The terminal station 4 is a satellite IoT terminal. The terminal station 4 collects data such as environmental data detected by the sensor. The terminal station 4 transmits a terminal uplink signal including the collected data to the mobile relay station 5. The terminal station 4 transmits the terminal uplink signal 40 as a desired signal to the mobile relay station 5 moving in the sky by a wireless method used in the satellite IoT platform. Here, the wireless method used by the terminal station 4 is different from the wireless method used by the reference station 2.

The mobile relay station 5 is a relay device. The mobile relay station 5 is installed on a moving object to move in the sky. The mobile relay station 5 is provided in, for example, a low earth orbit (LEO) satellite. The mobile relay station 5 revolves around the earth along a predetermined orbit. The altitude of the LEO satellite is 2000 km or less, and the LEO satellite revolves around the earth in approximately 1.5 hours for a revolution. The mobile relay station 5 receives a terminal uplink signal from each terminal station 4 while moving above the earth.

The mobile relay station 5 accumulates data received from the terminal station 4 as a terminal uplink signal. The mobile relay station 5 transmits the accumulated data to the base station 6 at a timing at which communication with the base station 6 is possible. The mobile relay station 5 transmits the accumulated data to the base station 6 using the base station downlink signal.

The mobile relay station 5 includes an antenna used for wireless communication with the terminal station 4 and an antenna used for wireless communication with the base station 6. Therefore, the mobile relay station 5 can execute wireless communication related to the terminal station 4 and wireless communication related to the base station 6 in parallel. The mobile relay station 5 executes, for example, multiple input multiple output (MIMO) communication.

The mobile relay station 5 receives the reference signal 20 from the reference station 2 within the coverage at the current location using a plurality of reception antennas. The mobile relay station 5 receives an interference signal from the interference station 3 within the coverage at the current location using a plurality of reception antennas. The mobile relay station 5 receives a terminal uplink signal from the terminal station 4 within the coverage at the current location using a plurality of reception antennas. When the mobile relay station 5 moves, the base station downlink signal including data accumulated in the mobile relay station 5 is wirelessly transmitted to the base station 6 at a timing when the base station 6 exists in the coverage.

The base station 6 is an Earth station. The base station 6 can communicate with the mobile relay station 5 using the base station downlink signal. The base station 6 acquires, from the received base station downlink signal, data collected by the terminal station 4. The base station 6 obtains data by demodulating the base station downlink signal. Here, the base station 6 obtains data transmitted from the terminal station 4 by executing demodulation and decoding on the terminal uplink signal relayed by the mobile relay station 5.

Next, embodiments of the present invention are now described in detail with reference to the drawings.

Figure 2:
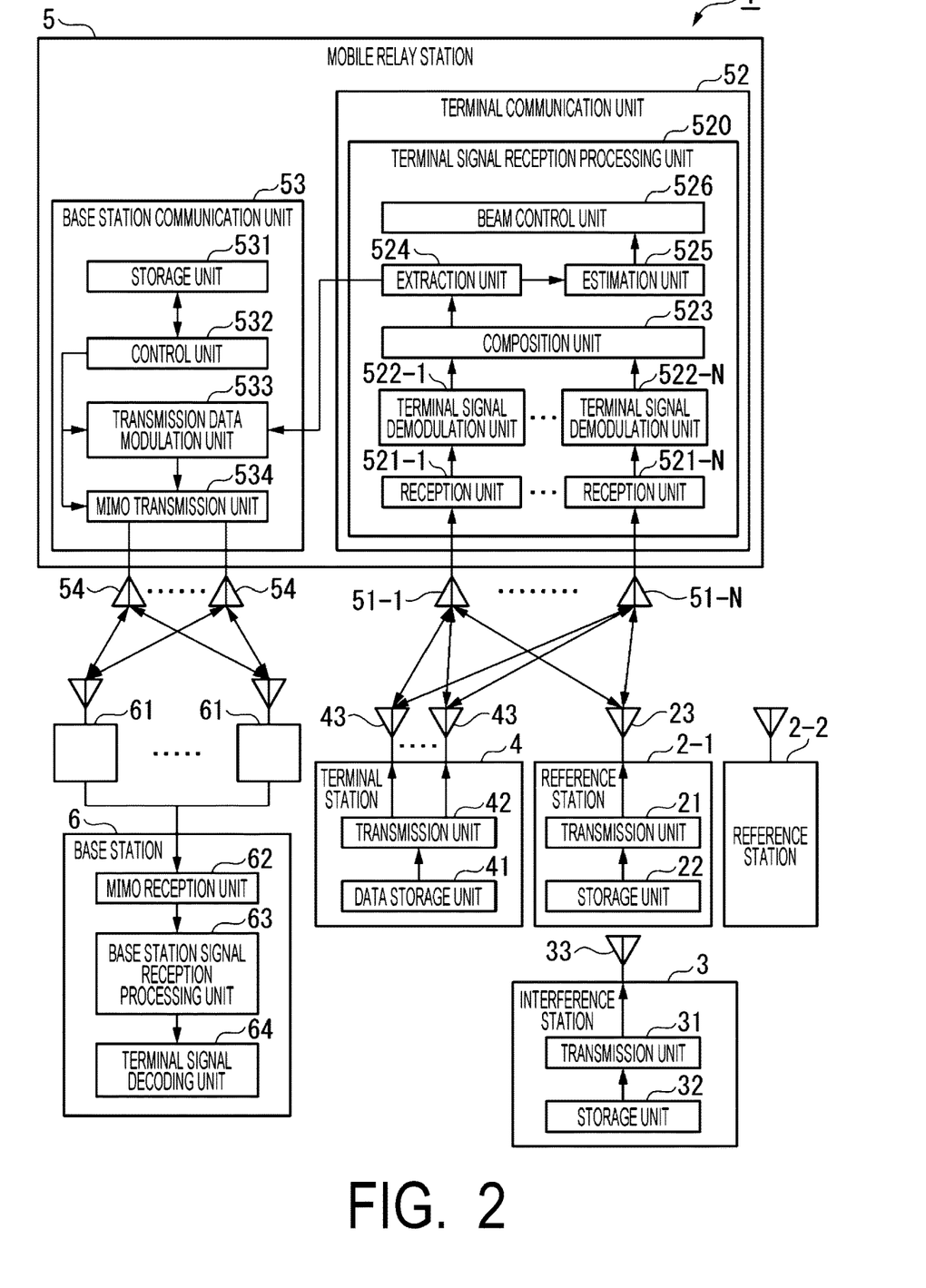
FIG. 2 is a diagram illustrating a configuration example of the wireless communication system according to the embodiment.

FIG. 2 is a diagram illustrating a configuration example of the wireless communication system 1 in a first embodiment. The reference station 2 includes a transmission unit 21, a storage unit 22, and one or a plurality of antennas 23. The transmission unit 21 transmits the reference signal 20 to the mobile relay station 5 using the antenna 23 in the third wireless method used in the satellite IoT platform. The third wireless method is, for example, ELTRES (registered trademark). The storage unit 22 stores a known signal (known data) included in the reference signal 20. The reference signal 20 includes identification information assigned to the reference station 2. The identification information assigned to the reference station 2 is stored in advance in the mobile relay station 5. Note that the position of the reference station 2 may be stored in advance in the mobile relay station 5 for each piece of identification information of the reference station 2.

The interference station 3 includes a transmission unit 31, a storage unit 32, and one or a plurality of antennas 33. The transmission unit 31 transmits the interference signal 30 using one or a plurality of antennas 33 in the second wireless method used in the ground IoT platform. The second wireless method is, for example, IEEE 802.15.4k. The storage unit 32 stores the known signal included in the interference signal 30.

The terminal station 4 includes a data storage unit 41, a transmission unit 42, and a plurality of antennas 43. The data storage unit 41 stores sensor data. The data storage unit 41 may store a known signal (preamble) included in the terminal uplink signal. The transmission unit 42 reads the sensor data from the data storage unit 41. The transmission unit 42 includes the sensor data in the terminal uplink signal 40. The transmission unit 42 transmits the terminal uplink signal 40 as the desired signal to the mobile relay station 5 by the first wireless method used in the satellite IoT platform using the plurality of antennas 43. The first wireless method is, for example, LoRa (registered trademark) or LoRaWAN (registered trademark) of low power wide area (LPWA).

The mobile relay station 5 includes antennas 51-1 to 51-N, a terminal communication unit 52, a base station communication unit 53, and a plurality of antennas 54.

The terminal communication unit 52 includes a terminal signal reception processing unit 520 (control device) (control apparatus). The terminal signal reception processing unit 520 includes reception units 521-1 to 521-N (receptor), terminal signal demodulation units 522-1 to 522-N, a composition unit 523, an extraction unit 524, an estimation unit 525 (estimator), and a beam control unit 526 (beam controller).

The terminal signal reception processing unit 520 as a control device installed on a low orbit satellite directs the null of the reception beam in the arrival direction of the reference signal 20 transmitted from the reference station 2. As a result, the null of the reception beam is directed in the arrival direction of the interference signal 30 transmitted from an enormous number of interference stations 3. In addition, the terminal signal reception processing unit 520 directs the reception beam 50 in the arrival direction of the terminal uplink signal 40 as the desired signal transmitted from the terminal station 4.

The reception unit 521-$n$ ($n$ is an integer between 1 and N) receives the terminal uplink signal from the terminal station 4 using the reception beam 50 generated by the plurality of antennas 51.

The terminal signal demodulation unit 522 executes reception processing of a wireless signal including a terminal uplink signal. A terminal signal demodulation unit 523-$n$ executes demodulation processing on the wireless signal received by the reception unit 521-$n$. The terminal signal demodulation unit 523-$n$ outputs the demodulation result to the composition unit 523.

The composition unit 523 combines the demodulation results input from each of the terminal signal demodulation units 522-1 to 522-N. The composition unit 523 outputs the combined demodulation information to the extraction unit 524.

The extraction unit 524 separates the desired signal from the combined demodulation information (received wireless signal) based on the known signal (for example, a preamble) in the desired signal, thereby extracting demodulation information of the desired signal from the combined demodulation information. The extraction unit 524 may suppress the reference signal and the interference signal to a low level by despreading processing using the spreading code in the first wireless method of the terminal station 4 and extract the demodulation information of the desired signal from the wireless signal. The extraction unit 524 outputs demodulation information of the desired signal to the base station communication unit 53 and the estimation unit 525.

Note that, among the LPWA methods used in the IoT wireless system in the 920 MHz band, in a method such as "LoRa (registered trademark)", "LoRaWAN (registered trademark)", "IEEE 802.15.4k", or "ELTRES (registered trademark)", it is possible to convert the reference signal and the interference signal into a low level signal (noise equivalent signal) by spreading the reference signal and the interference signal over a broadband by despreading processing.

The extraction unit 524 separates the reference signal from the combined demodulation information (received wireless signal) based on the known signal (for example, a preamble) in the reference signal, thereby extracting demodulation information of the reference signal from the combined demodulation information. The extraction unit 524 may suppress the desired signal and the interference signal to a low level by despreading processing using the spreading code in the third wireless method of the reference station 2 and extract the demodulation information of the reference signal from the wireless signal. The extraction unit 524 outputs demodulation information of the reference signal to the estimation unit 525.

In addition, in the 920 MHz band wireless system, there is a constraint that the continuous transmission time per transmission of one wireless station is within 4 seconds. Therefore, only one reference station 2 cannot always transmit a reference signal. Therefore, the extraction unit 524 may extract the demodulation information from the reference signals alternately transmitted from the plurality of reference stations 2, respectively. When the plurality of reference stations 2 alternately transmit reference signals, the reference signals always arrive for the mobile relay station 5. The mobile relay station 5 can constantly direct the null of the reception beam in the arrival direction of the reference signal based on the demodulation information of the reference signal that constantly arrives in this manner.

The estimation unit 525 executes decoding processing on the demodulated signal. The estimation unit 525 estimates a component of a propagation channel between the reference station 2 and the terminal signal reception processing unit 520 based on a known signal (for example, a preamble) in the reference signal. The estimation unit 525 estimates a component of a propagation channel between the terminal station 4 and the terminal signal reception processing unit 520 based on a known signal (for example, a preamble) in the desired signal.

The beam control unit 526 generates a weight matrix for forming a reception beam based on the component of the propagation channel between the reference station 2 and the terminal signal reception processing unit 520. The beam control unit 526 generates a weight matrix using, for example, the ZF method or the MMSE method. The beam control unit 526 forms a reception beam by multiplying the received reference signal by the weight matrix. In this manner, the beam control unit 526 directs the null of the reception beam in the arrival direction of the reference signal. That is, the beam control unit 526 directs the null of the reception beam in the arrival direction of the interference signal based on the component of the propagation channel between the reference station 2 and the terminal signal reception processing unit 520.

In addition, the beam control unit 526 generates a weight matrix based on the component of the propagation channel between the terminal station 4 and the terminal signal reception processing unit 520. The beam control unit 526 forms a reception beam by multiplying the received terminal uplink signal by the weight matrix. In this manner, the beam control unit 526 directs the reception beam in the arrival direction of the terminal uplink signal.

The base station communication unit 53 transmits the terminal uplink signal received by MIMO to the base station 6 by MIMO. The base station communication unit 53 includes a storage unit 531, a control unit 532, a transmission data modulation unit 533, and a MIMO transmission unit 534.

The storage unit 531 stores a weighting coefficient of each antenna 54 for determining the direction of the transmission beam for each transmission time. These weighting coefficients are derived based on the orbit information of the LEO satellite and the position of each antenna station 61.

The control unit 532 instructs the MIMO transmission unit 534 on the weighting coefficient for each transmission time read from the storage unit 531. The transmission data modulation unit 533 acquires demodulation information of the desired signal from the extraction unit 524. The transmission data modulation unit 533 executes modulation processing on the demodulation information of the desired signal.

The MIMO transmission unit 534 weights the modulated parallel signal by using the weighting coefficient instructed from the control unit 532. As a result, the MIMO transmission unit 534 generates the base station downlink signal transmitted from each antenna 54. The MIMO transmission unit 534 transmits the generated base station downlink signal from each antenna 54 by MIMO.

The base station 6 includes a plurality of antenna stations 61, a MIMO reception unit 62, a base station signal reception processing unit 63, and a terminal signal decoding unit 64.

The antenna stations 61 are arranged at positions spaced apart from the other antenna stations 61 such that the difference in arrival angle of signals from each of the plurality of antennas 54 of the mobile relay station 5 increases. Each antenna station 61 converts the base station downlink signal received from the mobile relay station 5 into an electrical signal and outputs the electrical signal to the MIMO reception unit 62.

The MIMO reception unit 62 aggregates the base station downlink signals received from the plurality of antenna stations 61. The MIMO reception unit 62 stores in advance the weighting coefficient for each reception time with respect to the base station downlink signal received by each antenna station 61 based on the orbit information of the LEO satellite and the position of each antenna station 61. The MIMO reception unit 62 multiplies the base station downlink signal input from each antenna station 61 by a weighting coefficient corresponding to the reception time of the base station downlink signal, and combines the reception signals multiplied by the weighting coefficient. The base station signal reception processing unit 63 demodulates the combined reception signal to obtain demodulation information. The base station signal reception processing unit 63 obtains the sensor data transmitted from the terminal station 4 by decoding the symbol of the terminal uplink signal indicated by the demodulation information of the desired signal.

Next, an operation of the wireless communication system 1 will be described.

Figure 3:
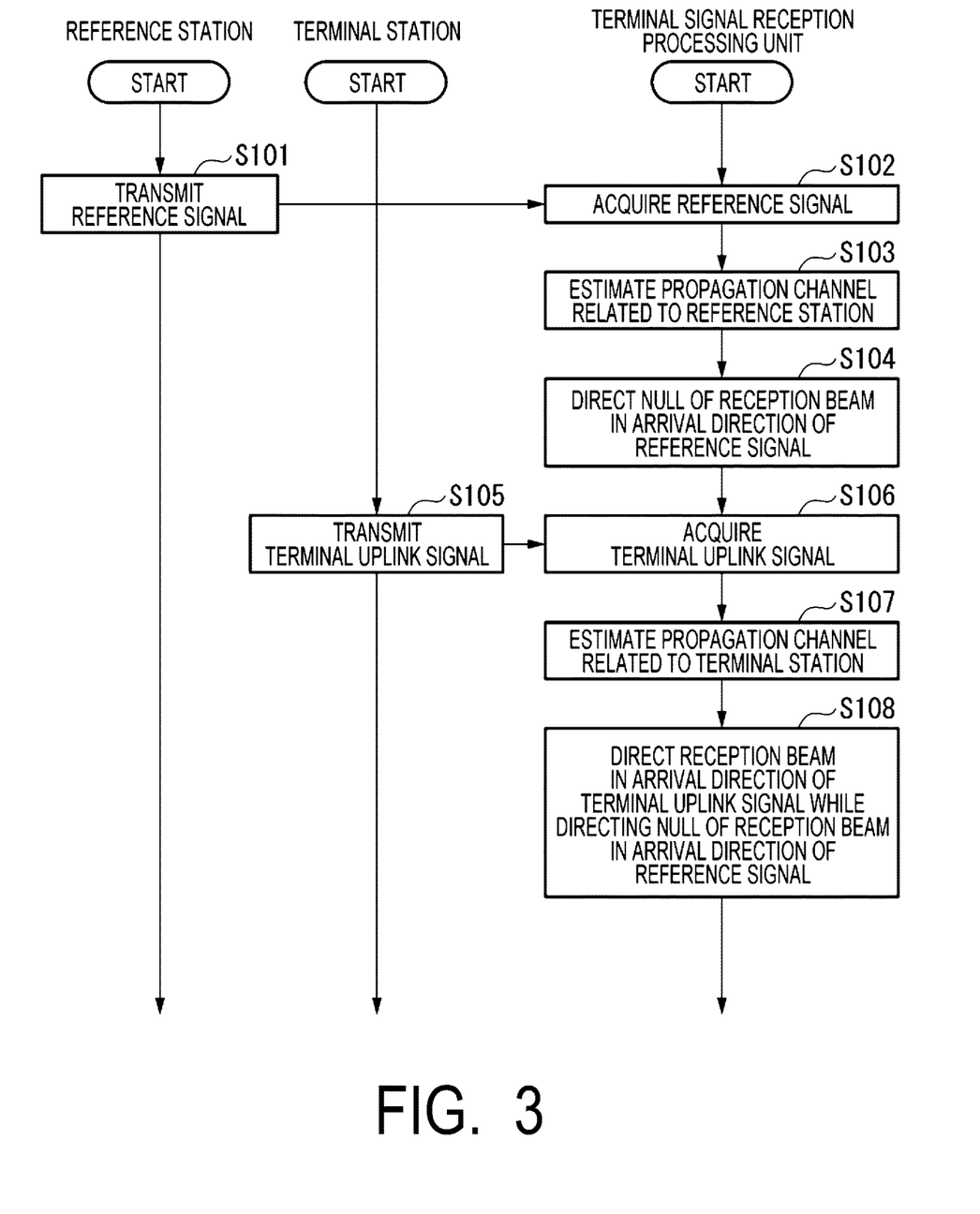
FIG. 3 is a flowchart illustrating an operation example of a reference station, a terminal station, and a terminal signal reception processing unit in the embodiment.

FIG. 3 is a flowchart illustrating an operation example of the reference station 2, the terminal station 4, and the terminal signal reception processing unit 520 in the embodiment. The reference station 2 disposed in the vicinity of the interference station 3 transmits the reference signal to the terminal signal reception processing unit 520 (step S101). The terminal signal reception processing unit 520 acquires the reference signal using the antenna 51 (step S102). The terminal signal reception processing unit 520 estimates a propagation channel between the reference station 2 and the terminal signal reception processing unit 520 based on the reference signal (step S103). The terminal signal reception processing unit 520 directs the null of the reception beam in the arrival direction of the reference signal based on the propagation channel between the reference station 2 and the terminal signal reception processing unit 520 (step S104).

The terminal station 4 transmits the terminal uplink signal as a desired signal to the terminal signal reception processing unit 520 (step S105). The terminal signal reception processing unit 520 acquires the terminal uplink signal by using the antenna 51 (step S106). The terminal signal reception processing unit 520 estimates a propagation channel (second propagation channel) between the terminal station 4 and the terminal signal reception processing unit 520 based on the terminal uplink signal (step S107). The terminal signal reception processing unit 520 directs the reception beam in the arrival direction of the terminal uplink signal while directing the null of the reception beam in the arrival direction of the reference signal (step S108).

Note that, for ease of description, in FIG. 3, the terminal uplink signal (desired signal) and the reference signal are transmitted at different timings (step S101, step S105). The reference signal and the terminal uplink signal do not necessarily need to be transmitted at different timings from each other, and may be transmitted simultaneously. Even in a case where the reference signal and the terminal uplink signal are simultaneously transmitted, the wireless methods are different from each other, and thus it is possible to suppress the other signal to a low level by despreading processing of one signal. Therefore, even in a case where the reference signal and the terminal uplink signal are simultaneously transmitted, it is possible to estimate the propagation channel.

Figure 4:
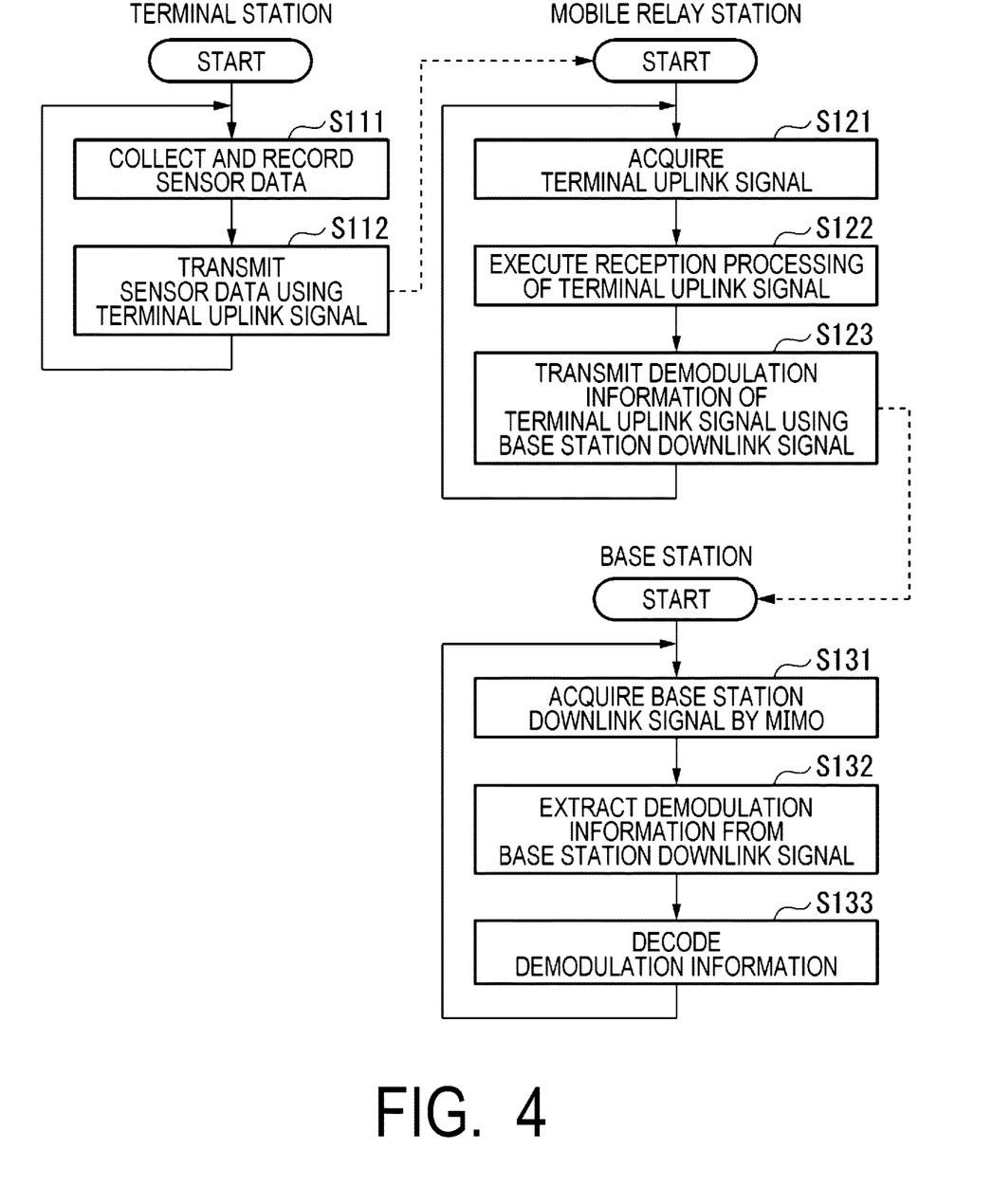
FIG. 4 is a flowchart illustrating processing of the wireless communication system in the embodiment.

FIG. 4 is a flowchart illustrating processing of the wireless communication system 1. The terminal station 4 collects sensor data and records the collected data in the data storage unit 41 (step S111).

The transmission unit 42 reads sensor data as terminal transmission data from the data storage unit 41. At the transmission start timing obtained in advance based on the orbit information of the LEO satellite on which the mobile relay station 5 is installed, the transmission unit 42 wirelessly transmits the terminal uplink signal including the terminal transmission data from the antenna 43 (step S112). The terminal station 4 repeats the processing from step S111.

The reception units 521-1 to 521-N of the mobile relay station 5 receive the terminal uplink signals transmitted from the terminal station 4 using the reception beams. Here, the reception units 521-1 to 521-N receive terminal uplink signals of the same frequency from one terminal station 4 in a time division manner according to the wireless communication method of the terminal station 4 as a transmission source. The reception units 521-1 to 521-N receive the terminal uplink signals of the same frequency from the plurality of terminal stations 4 at the same time according to the wireless communication method of the terminal station 4 as a transmission source (step S121).

The terminal signal demodulation unit 522 demodulates the terminal uplink signal received in step S121 (step S122). Specifically, the terminal signal demodulation unit 522-n specifies the wireless communication method based on the information specific to the wireless communication method included in the terminal uplink signal received by the reception unit 521-n. The reception units 521-1 to 521-N demodulate the terminal uplink signal according to the specified wireless communication method, and output the demodulation results to the composition unit 523. The composition unit 523 outputs, to the extraction unit 524, demodulation information that is a result of addition and combination of the demodulation results input from each of the terminal signal demodulation units 522-1 to 522-N.

The extraction unit 524 separates the desired signal from the demodulation information (received wireless signal) that is a result of the addition and combination, thereby extracting the demodulation information of the desired signal from the combined demodulation information. The extraction unit 524 outputs demodulation information of the desired signal to the transmission data modulation unit 533 and the estimation unit 525.

The transmission data modulation unit 533 acquires demodulation information of the desired signal as transmission data. The transmission data modulation unit 533 modulates a result of parallel conversion of the transmission data. The MIMO transmission unit 534 weights the transmission data modulated by the transmission data modulation unit 533 by the weighting coefficient instructed from the control unit 532, and generates the base station downlink signal transmitted from each antenna 54. The MIMO transmission unit 534 transmits the generated base station downlink signals from the antenna 54 by MIMO (step S123). The mobile relay station 5 repeats the processing from step S121.

Each antenna station 61 of the base station 6 receives the base station downlink signal from the mobile relay station 5 (step S131). Each antenna station 61 outputs, to the MIMO reception unit 62, a reception signal obtained by converting the received base station downlink signal into an electrical signal. The MIMO reception unit 62 synchronizes the timings of the reception signals received by each antenna station 61. The MIMO reception unit 62 multiplies the wireless signal received by each antenna station 61 by the weighting coefficient, and adds the multiplication result. The base station signal reception processing unit 63 demodulates the added wireless signal (step S132). The base station signal reception processing unit 63 outputs demodulation information obtained by decoding the demodulated wireless signal to the terminal signal decoding unit 64.

The terminal signal decoding unit 64 decodes the symbol of the terminal uplink signal indicated by the demodulation information, and obtains terminal transmission data transmitted from the terminal station 4 (step S133). The base station 6 repeats the processing from step S131.

As described above, in the wireless communication system 1 (for example, a low-power wireless system in the 920 MHz band), the terminal signal reception processing unit 520 (control device) provided in the mobile relay station 5 (relay device) is installed on a moving object and moves. The moving object is, for example, a low orbit satellite or an unmanned aerial vehicle. The terminal station 4 (first communication device) as the satellite IoT terminal transmits the desired signal to the terminal signal reception processing unit 520 of the mobile relay station 5 (relay device) by the first wireless method. The interference station 3 (second communication device) as the ground IoT terminal transmits an interference signal interfering with the desired signal by the second wireless method. The reference station 2 (third communication device) is installed in the vicinity of the interference station 3 (within a predetermined distance).

Here, the wireless method of the desired signal, the wireless method of the interference signal, and the wireless method of the reference signal are different from each other. For example, the wireless method of the desired signal is LoRa (registered trademark) or LoRaWAN (registered trademark) of LPWA. For example, the wireless method of the interference signal is IEEE 802.15.4k. For example, a wireless method of the reference signal is ELTRES (registered trademark). Even in a case where any one of the wireless method of the desired signal, the wireless method of the interference signal, and the wireless method of the reference signal is common, the spreading factor (spreading code) of the desired signal, the spreading factor (spreading code) of the interference signal, and the spreading factor (spreading code) of the reference signal are different from each other.

The reception unit 521 acquires a wireless signal including a reference signal and a desired signal from the plurality of antennas 51. The desired signal is transmitted from the terminal station 4 by the predetermined first wireless method. The reference signal is transmitted from the reference station 2 in the vicinity of the interference station 3 by the predetermined third wireless method. The extraction unit 524 extracts the reference signal from the wireless signal based on the predetermined third wireless method. The estimation unit 525 estimates a propagation channel (first propagation channel) between the reference station 2 and the terminal signal reception processing unit 520 based on the reference signal. The beam control unit 526 directs the null of the reception beam in the arrival direction of the reference signal based on the propagation channel between the reference station 2 and the terminal signal reception processing unit 520. The beam control unit 526 directs the null of the reception beam in the arrival direction of the interference signal based on the propagation channel between the reference station 2 and the terminal signal reception processing unit 520.

Accordingly, it is possible to improve the reception sensitivity of the wireless signal transmitted from the IoT terminal communicating with the moving relay device.

Modification Example of Embodiment

Any one of the first wireless method, the second wireless method, and the third wireless method may be a narrowband transmission method that does not use spreading processing. The narrowband transmission method that does not use the spreading processing is, for example, Sigfox (registered trademark).

For example, in a case where a terminal uplink signal of LoRa (registered trademark) and an interference signal of Sigfox (registered trademark) are received at the same time, the despreading processing of LoRa (registered trademark) is executed to execute demodulation and decoding on the terminal uplink signal of LoRa (registered trademark). As a result, the interference signal of Sigfox (narrowband signal) is spread over a wide band, and thus the influence of interference by the interference signal of Sigfox is suppressed.

For example, in a case where an interference signal of LoRa (registered trademark) and a terminal uplink signal of Sigfox (registered trademark) are received at the same time, the terminal uplink signal of Sigfox (registered trademark) is a narrowband signal and the interference signal of LoRa (registered trademark) is a broadband signal, the extraction unit 524 extracts the terminal uplink signal by a filter only from the bandwidth of the terminal uplink signal of Sigfox (registered trademark). As a result, since the interference signal of LoRa (registered trademark) extending to the outside of the band of the filter is removed, the influence of interference due to the interference signal of LoRa (registered trademark) is suppressed.

The same applies to a case where the wireless method is IEEE 802.15.4k or ELTRES (registered trademark) instead of LoRa (registered trademark).

As a result, it is possible to extract a terminal uplink signal of Sigfox (registered trademark) which is a wireless method not using spreading processing.

The above is the description of the modification example of the embodiment.

Note that, in the above embodiment, the case where the moving object on which the mobile relay station is installed is an LEO satellite has been described, but the moving object may be, for example, a drone or a high altitude platform station (HAPS).

Figure 5:
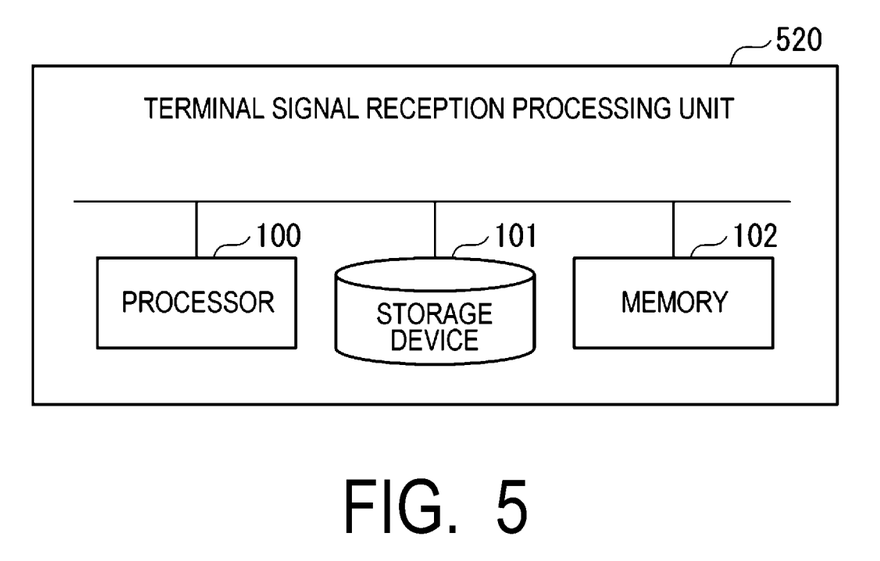
FIG. 5 is a diagram illustrating a hardware configuration example of a control device in the embodiment.

FIG. 5 is a diagram illustrating a hardware configuration example of functional units of the terminal signal reception processing unit 520 in the embodiment. A part of the terminal signal reception processing unit 520 in each of the above-described embodiments may be realized by a computer. In such a case, a program for realizing this function may be recorded in a computer-readable recording medium, and a program recorded in the recording medium may be read into a computer system and realized by execution. Note that the "computer system" mentioned herein includes an OS and hardware such as a peripheral device. Also, the "computer-readable recording medium" refers to a portable medium such as a flexible disk, a magneto-optical disk, a ROM, or a CD-ROM, or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for realizing some of the functions described above, may be realized with a combination of the functions described above and a program already recorded in a computer system, or may be realized with a programmable logic device such as a field programmable gate array (FPGA).

In other words, some or all of the functional units of the terminal signal reception processing unit 520 are realized as software by a processor 100 such as a central processing unit (CPU) executing a program stored in a memory 102 including a nonvolatile recording medium (non-transitory recording medium). The program may be recorded on a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 101 such as a hard disk built in a computer system. Some or all of the functional units of the wireless communication system may be realized using hardware including an electronic circuit (electronic circuit or circuitry) in which, for example, a large scale integrated circuit (LSI), an application specific integrated circuit (ASIC), a programmable logic device (PLD), a FPGA, or the like is used.

Although the embodiments of the present invention have been described in detail with reference to the drawings, specific configurations are not limited to the embodiments, and include design and the like within the scope of the present invention without departing from the gist of the present invention.

REFERENCE SIGNS LIST

1 Wireless communication system
2 Reference station
3 Interference station
4 Terminal station
5 Mobile relay station
6 Base station
20 Reference signal
21 Transmission unit
22 Storage unit
23 Antenna
30 Interference signal
31 Transmission unit
32 Storage unit
33 Antenna
40 Terminal uplink signal
41 Data storage unit
42 Transmission unit
43 Antenna
50 Reception beam
51 Antenna
52 Terminal communication unit
53 Base station communication unit
54 Antenna
61 Antenna station
62 MIMO reception unit 63 Base station signal reception processing unit
64 Terminal signal decoding unit
520 Terminal signal reception processing unit
521 Reception unit
522 Terminal signal demodulation unit
523 Composition unit
524 Extraction unit
525 Estimation unit
526 Beam control unit
531 Storage unit
532 Control unit
533 Transmission data modulation unit
534 MIMO transmission unit

The invention claimed is:

1. A control device of a wireless communication system including the control device that is installed on a moving object and moves, a first communication device that transmits a desired signal to the control device by a first wireless method, a second communication device that transmits an interference signal interfering with the desired signal by a second wireless method, and one or more third communication devices, the control device comprising:
    a receptor that acquires a wireless signal including a reference signal transmitted from the third communication device in the vicinity of the second communication device by a third wireless method and a desired signal transmitted from the first communication device by the first wireless method;
    an extractor that extracts the reference signal from the wireless signal based on the third wireless method;
    an estimator that estimates a first propagation channel between the third communication device and the control device based on the reference signal; and
    a beam controller that directs a null of a reception beam in an arrival direction of the reference signal based on the first propagation channel.

2. The control device according to claim 1, wherein
the extractor extracts the desired signal from the wireless signal based on the first wireless method,
the estimator estimates a second propagation channel between the first communication device and the control device based on a known signal in the desired signal, and
the beam controller directs a reception beam in an arrival direction of the desired signal based on the second propagation channel.

3. The control device according to claim 1, wherein
a wireless method of the desired signal, a wireless method of the interference signal, and a wireless method of the reference signal are different from each other.

4. The control device according to claim 1, wherein
a spreading factor of the desired signal, a spreading factor of the interference signal, and a spreading factor of the reference signal are different from each other.

5. The control device according to claim 1, wherein
the extractor extracts the reference signal from the wireless signal by despreading processing using a spreading code in the third wireless method.

6. The control device according to claim 1, wherein
the extractor extracts the reference signals alternately transmitted from a plurality of the third communication devices.

7. A control method executed by a control device of a wireless communication system including the control device that is installed on a moving object and moves, a first communication device that transmits a desired signal to the control device by a first wireless method, a second communication device that transmits an interference signal interfering with the desired signal by a second wireless method, and one or more third communication devices, the control method comprising:
    acquiring a wireless signal including a reference signal transmitted from the third communication device in the vicinity of the second communication device by a third wireless method and a desired signal transmitted from the first communication device by the first wireless method;
    extracting the reference signal from the wireless signal based on the third wireless method;
    estimating a first propagation channel between the third communication device and the control device based on the reference signal; and
    directing a null of a reception beam in an arrival direction of the reference signal based on the first propagation channel.

* * * * *